United States Patent [19]
Raulerson

[11] 3,871,325
[45] Mar. 18, 1975

[54] MARINE DRIVE SYSTEM

[76] Inventor: Sidney W. Raulerson, P. O. Box 2307, Miami, Fla. 33012

[22] Filed: Jan. 11, 1973

[21] Appl. No.: 322,744

[52] U.S. Cl. .................................. 115/34 R, 64/4
[51] Int. Cl. ............................................ B63h 5/08
[58] Field of Search ................. 115/34 R, 34 C, 35; 74/665 GB; 403/359; 64/3, 4, 6, 23, 32 R

[56] References Cited
UNITED STATES PATENTS

| | | | |
|---|---|---|---|
| 2,597,308 | 5/1952 | Erhardt | 64/3 |
| 2,999,476 | 9/1961 | Johnson | 115/35 |
| 3,261,229 | 7/1966 | Thomas et al. | 74/665 GB |
| 3,368,516 | 2/1968 | Macdonald et al. | 115/35 |

Primary Examiner—Trygve M. Blix
Assistant Examiner—Charles E. Frankfort
Attorney, Agent, or Firm—Schuyler, Birch, Swindler, McKie & Beckett

[57] ABSTRACT

A marine drive system which permits a single marine engine to transmit power to two propeller shafts positioned on opposite sides of a boat. A power distribution unit includes an input shaft connected at one end to a marine engine and at the other end to two articulated power transmitting apparatuses. Each transmitting apparatus includes a shaft connected to the distribution unit and a constant velocity universal joint connected to the outer end of such shaft. A pair of telescopingly engaged splined shafts are connected between each of the universal joints and a gear drive unit. A conventional marine transmission is connected to each gear drive unit, and a propeller shaft is connected to each transmission. The universal joints and splined shafts permit relative angular and axial movement between the power distribution unit and the gear drive units. The articulated drive elements are enclosed by a plurality of articulated housing sections. A portion of each of the universal joints and the associated splined shafts are enclosed by a pair of telescopingly engaged housing sections. One of such sections is connected to a central housing section through a two-axis gimbal ring having perpendicular pivot axes which intersect at the pivot center of the associated universal joint. The housing sections are thus articulated in a manner permitting the desired relative movement between the driving elements of the system.

9 Claims, 3 Drawing Figures

MARINE DRIVE SYSTEM

BACKGROUND OF THE INVENTION

Marine vehicles, such as boats, having a drive system comprising a single engine and single screw or propeller have disadvantageous and sometimes annoying handling characteristics. For example, a boat having only one propeller has a tendency to veer off course as a result of the torque produced by rotation of the propeller. This tendency to veer off course requires the helmsman to make constant course corrections.

In twin screw boats the screws or propellers are usually rotated in opposite directions so that the torque produced by one propeller tends to neutralize the torque produced by the other propeller thereby providing considerably better stability than single screw boats. Also, twin screw boats when being docked, especially when being backed into boat slips under adverse conditions, such as high winds and strong tides, have markedly superior handling characteristics than single screw boats.

Unfortunately, virtually all twin screw boats require a separate marine engine for driving each propeller. Marine engines are expensive and relatively heavy, especially when relatively large diesel engines are used. In addition, it is extremely difficult to adjust the speeds of both engines so that both propellers are driven at exactly the same rotational velocity. Any slight difference in the velocities of the propellers causes an annoying vibration in the boat.

Attempts have been made to drive two propeller shafts from a single engine, each shaft being individually controllable by a transmission interposed between the engine and each shaft. One such twin drive system is disclosed in Krause U.S. Pat. No. 3,112,728.

However, the propeller shafts, which are installed in the boat before the engine, usually are at least slightly misaligned, causing great difficulty in installing the prior art twin drive systems because such systems have no means to compensate for such misalignment.

Also, there is considerable variation in the position and angle of propeller shafts between twin screw boats of different design. Thus, unless a twin drive system is adjustable, a system must be specially designed for each different boat design.

Thus, it would be highly desirable to provide a marine twin drive system which will accommodate a wide variety of propeller shaft positions and angles.

In addition, it would be desirable to provide a marine twin drive system which will accommodate misaligned propeller shafts.

SUMMARY OF THE INVENTION

Accordingly, it is an object of the present invention to provide an improved marine twin drive system which will accommodate a wide variety of propeller shaft positions and angles.

It is another object of the invention to provide a marine twin drive system which will accommodate parallel or misaligned propeller shafts.

The marine twin drive system of the invention includes a plurality of articulated drive elements and a plurality of articulated housing sections which enclose such elements.

Basically, the system of the invention comprises; a power distribution unit operably connectable to a marine engine; a plurality of articulated power transmitting means connected to the power distribution unit, each of the transmitting means including, a first housing section, a first shaft rotatably mounted in the first housing section and drivably connected to the power distribution unit, a second housing section, a second shaft positioned in the second housing section, a universal joint drivingly connecting the first shaft to the second shaft, a gimbal element positioned about a portion of the first housing section and a portion of the second housing section, the first housing section being pivotally connected to the gimbal element for relative rotation therebetween about a first axis, the second housing section also being pivotally connected to the gimbal element for relative rotation therebetween about a second axis perpendicular to the first axis, the first and second axes intersecting at substantially the pivot center of the universal joint, a third housing section, the second and third housing sections being adjustably engaged for relative axial movement therebetween, and a third shaft rotatably mounted in the third housing section, the second shaft being drivingly connected to the third shaft, the second and third shafts also being adjustably engaged for relative axial movement therebetween; and a plurality of independently operable transmission means operably connected to the respective third shafts, each of the transmission means being drivingly connectable to a marine propeller shaft, whereby the articulated power transmitting means permits a single marine engine to be drivingly connected to a plurality of marine propeller shafts.

In the preferred marine twin drive system of the invention, the power distribution unit includes an input shaft operably connected at one end thereof to a marine engine and drivingly connected at the other end thereof to the first shafts of two power transmitting means. Preferably, the first shafts of both power transmitting means comprise a single shaft rotatably mounted in the first housing section and extending from opposite sides thereof.

It is further preferred that the transmission means be operably connected to the third shafts by right angle gear drive units.

One key characteristic of the system of the invention is its adjustability. Such adjustability is accomplished by a combination of several features:

First, the shafts connecting the power distribution unit to each of the transmission means are interconnected by a universal joint. The universal joint preferably is standard constant velocity universal joint, such as the disc type universal joint distributed by the Dana Corporation of Toledo, Ohio, shown in Dana Corporation bulletin No. 3217-1 of March 1972.

Second, the housing sections which enclose the shafts also are articulated by a gimbal element, preferably a gimbal ring, having two perpendicular pivot axes intersecting at the pivot center of the associated universal joint. One such section encloses a portion of the universal joint and is pivotally connected to one axis of the ring, and the other such section encloses the remaining portion of the universal joint and is pivotally connected to the other axis of the ring.

Third, in addition to the articulation achieved by the universal joint and gimbal ring, both the shafts and housing sections which connect the power distribution unit to each of the gear drive units are axially adjustable.

DESCRIPTION OF THE PREFERRED EMBODIMENT

Figure 1:
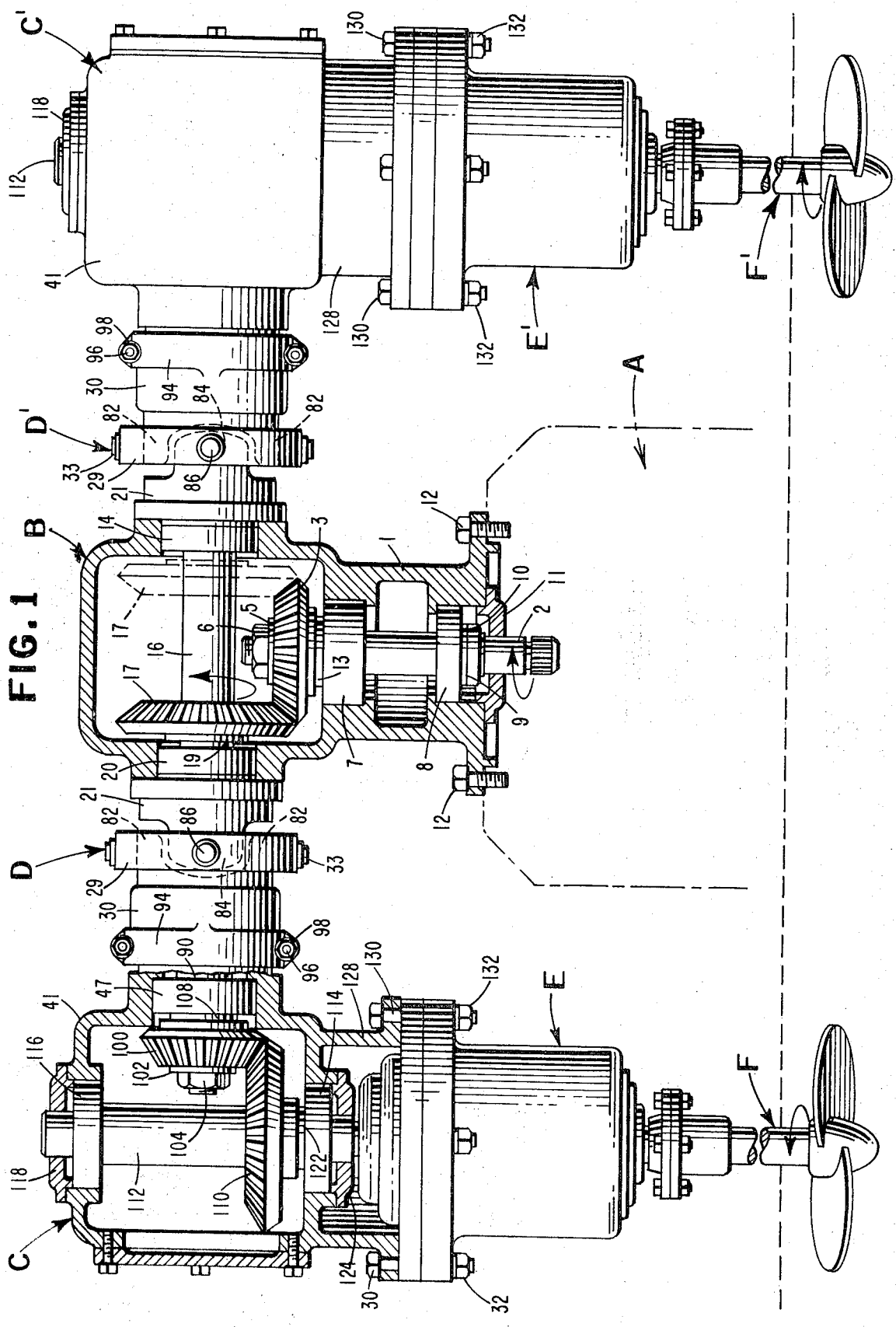
FIG. 1 is a top plan view, partially in section, of a preferred embodiment of the marine twin drive system of the invention.

The marine twin drive system of the invention is adapted to be connected to a conventional marine engine A, shown in phantom in FIG. 1. Basically, the drive system includes a central power distribution unit B drivingly connected to two right angle gear drive units C and C' by two power transmitting means D and D', respectively. Units C and C' are drivingly connected to two independently operable conventional marine transmissions E and E', respectively, and transmissions E and E' are drivingly connected to two marine propeller shafts F and F', respectively.

Power distribution unit B includes a shaft 2 adapted to be connected at one end to the drive shaft of engine A. Shaft 2 is rotatably mounted in a housing section 1 by bearings 7 and 8. Bearing 8 is clamped against an internal shoulder of section 1 by a washer 9 and a locknut 10 threadably engaged with shaft 2. The end of housing section 1 adjacent engine A is sealed by a cap seal assembly 11. Also, housing section 1 is attached to the bell housing of engine A by a plurality of bolts 12 which extend through a circular flange formed at the end of the section.

Figure 2:
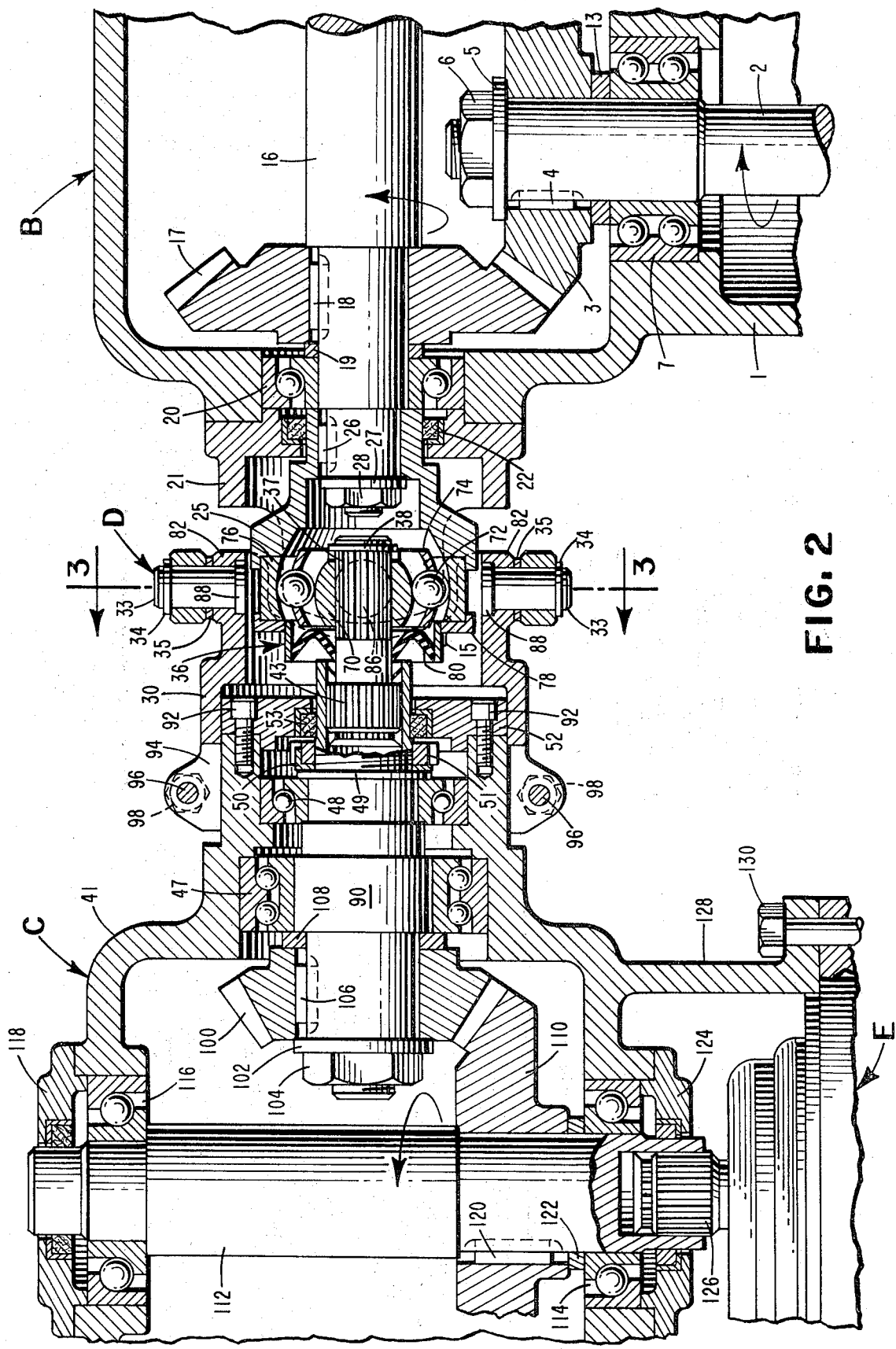
FIG. 2 is a sectional view of the power distribution unit and one of the power transmitting means of the system shown in FIG. 1.

A pinion gear 3 is mounted on the other end of shaft 2 by a washer 5 and a nut 6, and is locked onto the shaft by a key 4 which engages a keyway in the shaft (FIG. 2). The inner end of gear 3 bears against a spacer 13 which clamps bearing 7 against an internal shoulder of housing 1. Pinion gear 3 drivingly meshes with another pinion gear 17 mounted on a shaft 16. The inner end of gear 17 abuts a shoulder on shaft 16, and the gear is locked onto the shaft by a key 18 which engages a keyway in the shaft.

Shaft 16 extends through opposite sides of housing section 1 and is the first shaft of a plurality of articulated shafts comprising each of power transmitting means D and D'. Shaft 16 is rotatably mounted in housing section 1 by bearings 20 and 14. A spacer 19 is interposed between the outer end of gear 17 and bearing 20.

Power transmitting means D is shown in detail in FIG. 2, transmitting means D' being identical thereto. A universal joint adapter 25 is mounted on the end of shaft 16 by a washer 27 and a nut 28, and is locked onto the shaft by a key 26 which engages a keyway in the shaft. Nut 28 clamps gear 17 and bearing 20 in position on shaft 16, via washer 27, adapter 25, and spacer 19. Housing section 1 includes an extension 21 affixed to the side of such section by bolts or the like (not shown), and a seal 22 is mounted in extension 21 about adapter 25.

A conventional constant velocity universal joint 36 is connected to adapter 25. Joint 36 includes an internally splined inner race 70, a plurality of balls 72 spaced equidistantly apart around race 70, a cage 74 in which balls 72 are mounted, and an outer race 76. A plurality of bolts 15 extend through a circular flanged clamp 78 mounted on the outer end of outer race 76, through such race, and threadably engage adapter 25 to connect joint 36 to the adapter. An externally splined shaft 37 engages inner race 70 and is locked in position by a retaining ring 38. An elastomeric seal assembly 80 is affixed to clamp 78 and inner race 70 to seal joint 36.

A pair of diametrically opposed ears 82 are formed on the inner end of a housing section 30 which spacedly mate with a similar pair of diametrically opposed ears 84 formed on the outer end of extension 21.

Figure 3:
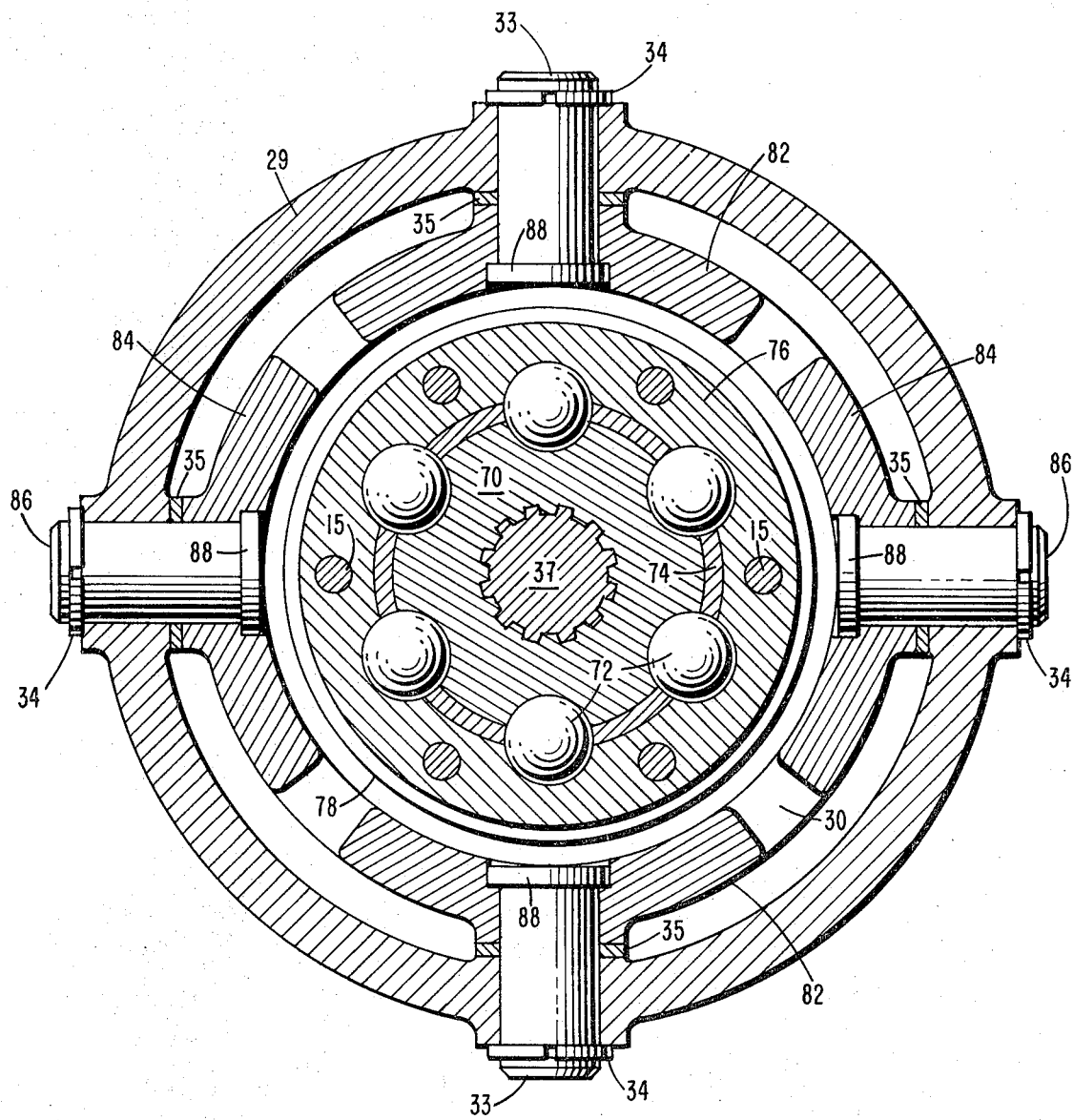
FIG. 3 is a sectional view taken on line 3—3 of FIG. 2.

A gimbal element, preferably a gimbal ring 29, is positioned about ears 82 and 84. Ring 29 is pivotally connected to ears 82 and 84 by pins 33 and 86, respectively (FIG. 3). An enlarged head 88 is formed at the inner end of each of pins 33 and 86 and bears against a countersunk shoulder formed on the inner surface of the associated ear 82 and 84. A retaining ring 34 is clamped about the outer end of each of pins 33 and 86 and bears against an abutment formed on the outer surface of ring 29. Also, a bearing spacer 35 is interposed between each of ears 82 and 84 and ring 29 about the associated pin 33 or 86. As shown in FIG. 3, the pivot axis defined by pins 33 is perpendicular to the pivot axis defined by pins 86, and as shown in FIG. 2, such axes intersect at the pivot center of joint 36.

Shaft 37 includes an enlarged, externally splined outer end portion 43. Portion 43 telescopingly engages the internally splined inner end portion of a shaft 90. Shaft 90 is rotatably mounted in a housing section 41 by bearings 47 and 48. Bearing 48 is clamped against an internal shoulder of section 41 by a washer 49, a lock washer 50 and a locknut 51 threadably engaged with shaft 90. A circular cap 52 is connected to the inner end of housing section 41 by a plurality of countersunk bolts 92. A seal 53 is mounted in cap 52 about shaft 90.

Cap 52 and the inner end of housing section 41 are telescopingly received within the outer portion of housing section 30. The extreme outer portion of section 30 is formed as a split collar 94 which may be clamped about housing section 41 by bolts 96 and nuts 98.

A pinion gear 100 is mounted on the outer end of shaft 90 by a washer 102 and a nut 104, and is locked onto the shaft by a key 106 which engages a keyway in the shaft. The inner end of gear 100 bears against a spacer 108, and such spacer clamps bearing 47 against an inner shoulder of housing section 41.

As will be apparent, joint 36 and the axially movable connection between shaft portion 43 and shaft 90 permit shaft 90 to be angularly and axially adjusted with respect to shaft 16. Also, the gimballed connection between extension 21 and housing section 30, and the axially movable connection between section 30 and housing section 41 permit the housing sections which enclose the drive elements to be similarly adjusted.

Housing section 41 encloses gear drive unit C which includes gear 100, a pinion gear 110 and a shaft 112. Gear 110 is mounted on shaft 112 with the inner end thereof bearing against a shoulder formed on the shaft, and is locked onto the shaft by a key 120 which engages a keyway in the shaft. Shaft 112 is rotatably mounted in section 41 by bearings 114 and 116. Bearing 116 is clamped between a shoulder formed on shaft 112 and a cap seal assembly 118. A spacer 122 bears against the outer side of gear 110, and bearing 114 is clamped between such spacer and a cap seal assembly 124.

The outer end of shaft 112 is internally splined and engages an externally splined input shaft 126 of transmission E. Housing section 41 includes a flanged cylindrical portion 128 which is connected to the housing of transmission E by a plurality of bolts 130 and nuts 132.

Transmissions E and E' preferably are conventional reversible hydraulic marine transmissions, and are connected to marine propeller shafts F and F', respectively, in a conventional manner.

Due to the arrangement of gears 17 and 100 propeller shafts F and F' will be rotated in opposite directions, as shown in FIG. 1. Should it be desirable to rotate the propeller shafts opposite to the directions shown in FIG. 1, the position of gear 17 on shaft 16 merely is reversed, as shown in phantom in FIG. 1.

The marine twin drive system of the invention may be used to connect a single marine engine to the propeller shafts of a wide variety of twin screw boats of different design, having different propeller shaft positions and angles. Also, the system accommodates twin screw boats having misaligned propeller shafts.

The system preferably is equipped with a force fed lubrication system having an oil pump, oil reservoir and heat exchanger. Also, shafts 12 of gear drive units C and C' may be used for driving auxiliary equipment, such as refrigeration units, pumps, etc.

The system of the invention readily is adaptable for use with a variety of marine drive arrangement. For example, while the system as described above is shown for use with a typical inboard or V-drive arrangement, the system also may be used with an inboard-outboard drive arrangement. With the latter arrangement, engine A may be positioned on the other side, i.e., forward side, of power distribution unit B. Also, two engines may be connected in tandem to the power distribution unit should additional power and/or space considerations make such an arrangment desirable.

In addition, for some hull configurations a four screw drive may be desirable. Two engines and two of the drive systems of the invention may be used with such an arrangement.

While the foregoing constitutes a detailed description of a preferred embodiment of the system of the invention, it recognized that modifications thereof will occur to those skilled in the art. Therefore, the scope of the invention is to be limited solely by the scope of the appended claims.

I claim:

1. A marine drive system for drivingly connecting a single marine engine to a plurality of marine propeller shafts comprising:

a power distribution unit operably connectable to a marine engine;

a plurality of articulated power transmitting means connected to said power distribution unit, each of said transmitting means including, a first housing section, a first shaft rotatably mounted in said first housing section and drivingly connected to said power distribution means, a second housing section, a second shaft positioned in said second housing section, a universal joint drivingly connecting said first shaft to second shaft, a gimbal element positioned about a portion of said first housing section and a portion of said second housing section, said first housing section being pivotally connected to said gimbal element for relative rotation therebetween about a first axis, said second housing section also being pivotally connected to said gimbal element for relative rotation therebetween about a second axis perpendicular to said first axis, said first and second axes intersecting at substantially the pivot center of said universal joint, a third housing section, said second and third housing sections being adjustably engaged for relative axial movement therebetween and being provided with clamping means for fixing the axial adjustment between said second and third housing sections, and a third shaft rotatably mounted in said third housing section, said second shaft being drivingly connected to said third shaft, said second and third shafts also being adjustably engaged for relative axial movement therebetween, whereby said third shaft is angularly and axially movable with respect to said first shaft; and a plurality of independently operable reversible transmission means operably connected to said respective third shafts, each of said transmission means being drivingly connectable to a marine propeller shaft.

2. A marine drive system as recited in claim 1, wherein said second and third shafts are telescopingly engaged and said second and third housing sections are telescopingly engaged.

3. A marine drive system as recited in claim 2, wherein said second and third shafts are splined.

4. A marine drive system as recited in claim 1, wherein said gimbal element is a ring.

5. A marine drive system as recited in claim 1, wherein said power distribution unit comprises a fourth shaft operably connectable at one end to a marine engine, a pinion gear mounted on the other end of said fourth shaft and means drivingly connecting said pinion gear to said first shafts.

6. A marine drive system as recited in claim 5 comprising two of said power transmitting means; and wherein said first shafts of both of said transmitting means comprise a single shaft; and wherein said connecting means comprises a second pinion gear mounted on said single shaft.

7. A marine drive system as recited in claim 1, wherein said transmission means are connected to said third shafts by respective gear drive units.

8. In a boat including, a hull, an engine mounted in said hull and having a drive shaft, a plurality of propeller shafts journalled in said hull, and a drive system drivingly connecting said drive shaft to said propeller shafts; the improvement wherein said drive system comprises the marine drive system recited in claim 1.

9. In a boat including, a hull, an engine mounted in said hull and having a drive shaft, a pair of laterally spaced propeller shafts journalled in said hull, and a drive system drivingly connecting said drive shaft to said propeller shafts; the improvement wherein said drive system comprises the marine drive system recited in claim 6.

* * * * *